No. 868,405. PATENTED OCT. 15, 1907.
G. F. BRANDENBURGH.
WHEEL.
APPLICATION FILED APR. 6, 1906.

2 SHEETS—SHEET 1.

WITNESSES:
Ethel B. Reed
F. C. Christiansen.

INVENTOR
George F. Brandenburgh
BY
Russell M. Everett
ATTORNEY

No. 868,405. PATENTED OCT. 15, 1907.
G. F. BRANDENBURGH.
WHEEL.
APPLICATION FILED APR. 6, 1906.
2 SHEETS—SHEET 2.
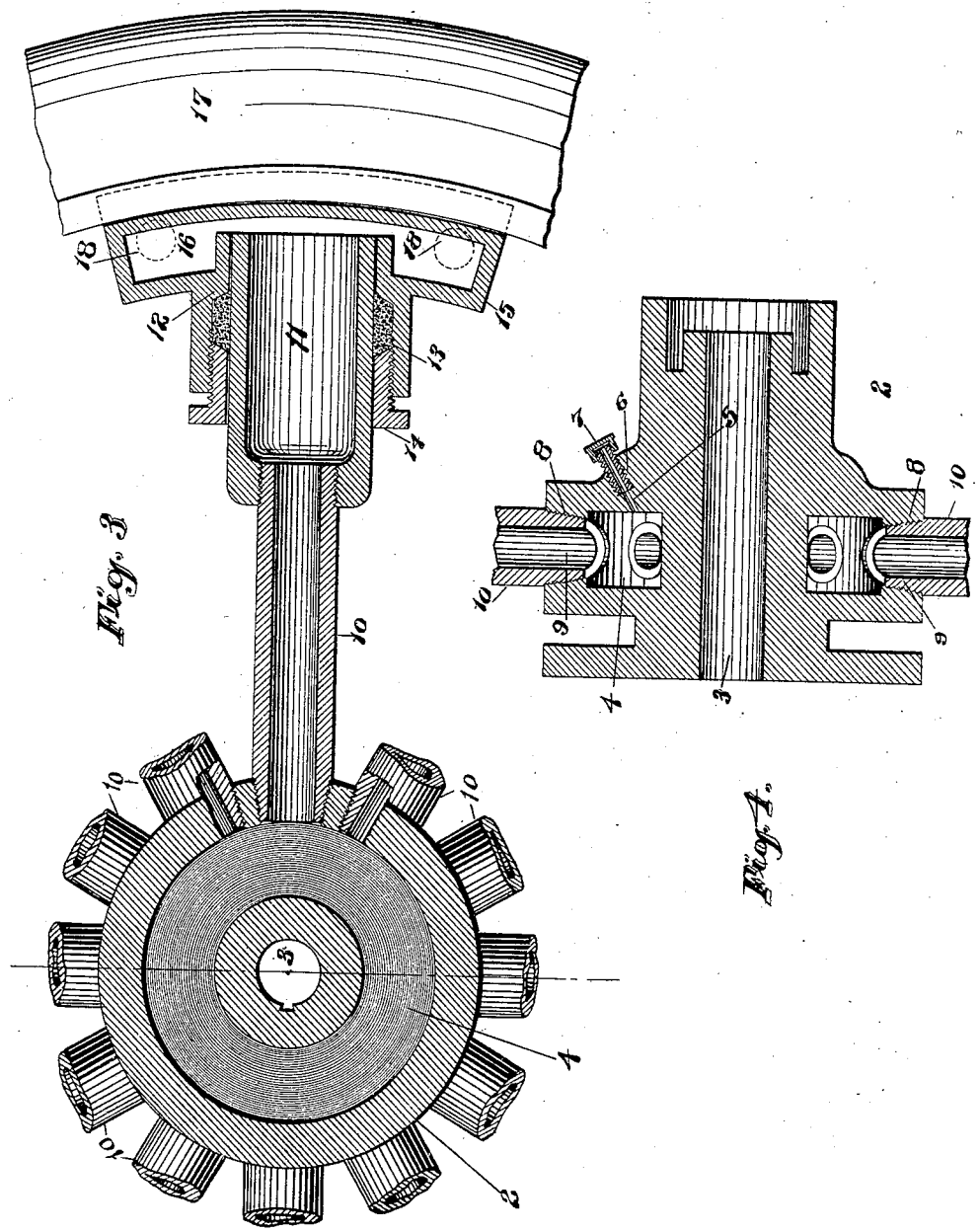
WITNESSES:
Ethel B. Reid
F. C. Christiansen.
INVENTOR
George F. Brandenburgh,
BY
Russell M. Everett
ATTORNEY

UNITED STATES PATENT OFFICE.

GEORGE F. BRANDENBURGH, OF IRVINGTON, NEW JERSEY.

WHEEL.

No. 868,405.　　　Specification of Letters Patent.　　　Patented Oct. 15, 1907.

Application filed April 6, 1906. Serial No. 310,248.

*To all whom it may concern:*

Be it known that I, GEORGE F. BRANDENBURGH, a citizen of the United States, residing at Irvington, in the county of Essex and State of New Jersey, have invented certain new and useful Improvements in Vehicle-Wheels, of which the following is a specification.

The objects of this invention are to provide a wheel having pneumatic cushioning means located elsewhere than at the tire of the wheel where it will come in contact with the roadbed and be liable to puncture; to combine such cushioning means with hollow spokes and enable a solid tire to be employed; to secure suitable air space by placing such spokes in communication with a hollow hub; to provide segmental felly sections having chambers independent of direct communication with each other but each communicating with one of the spokes; to provide a free movement of said sections longitudinally of the spokes without permitting leakage; to loosely connect the said felly sections so as to limit their movement, and to obtain other advantages and results as may be brought out in the following description.

The invention consists in the improved vehicle wheel, substantially as hereinafter described and claimed.

Figure 1:
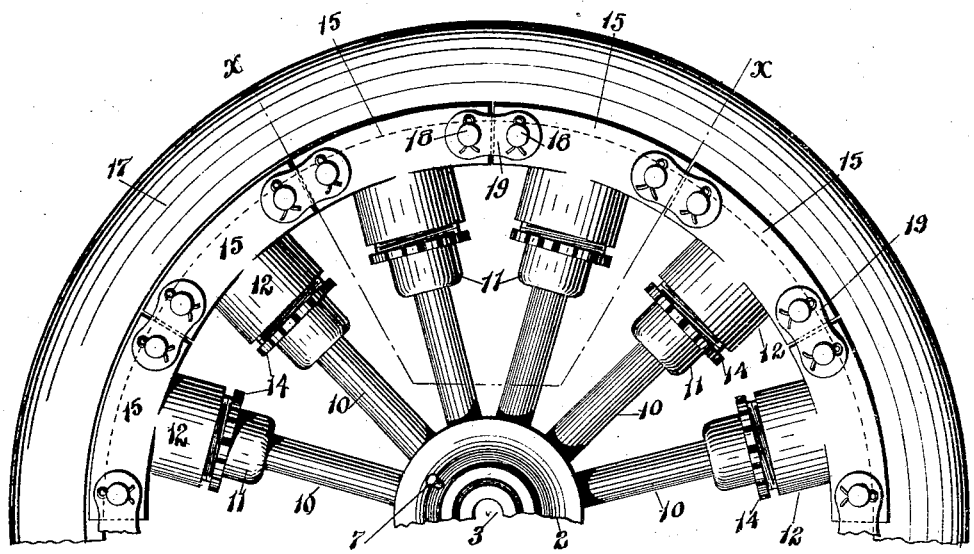
Figure 2:
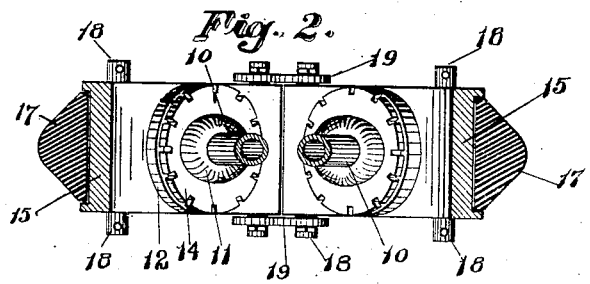

Referring to the accompanying drawings, in which like numerals of reference indicate corresponding parts in each of the several figures, Figure 1 is an elevation of the upper portion of a wheel of my improved construction, looking at its outer side; Fig. 2 is a section taken on line x—x, Fig. 1; Fig. 3 is a transverse section of the hub taken centrally and longitudinally through one of the spokes and felly sections, and Fig. 4 is a longitudinal section of the hub as on line y, Fig. 3.

In said drawings, 2 indicates the hub, which is preferably a casting providing a central passage 3, for the axle and having outside the same and between the ends of the hub an annular chamber 4. A small passage 5, leads from said chamber to a nipple 6, inserted at any convenient point in the outer surface of the hub, and provided with a cap 7, said parts being of any usual construction to permit filling the said chamber with compressed air. The periphery of the said hub 2, has in the plane of said chamber 4, threaded seats or sockets 8, adapted to have screwed thereinto the ends 9, of spokes 10, said spokes being hollow or tubular and thus connecting with the chamber 4, and with each other. At its outer end, each spoke is enlarged as at 11, and forms a piston head adapted to slide in the tubular mouth 12, of a felly section 15, said mouth being provided with packing 13, and a gland 14, to prevent leakage.

Each felly section 15, comprises a segment of the entire felly and is formed of a casting which contains an arc-shaped chamber 16 extending to both sides of and communicating with the tubular mouth 12. The outer curved surfaces of the sections are longitudinally channeled or recessed to receive a rubber tire 17, in any suitable manner. The ends of the sections 15, abut together loosely and are provided at their sides with studs or pintles 18, over which are arranged links 19, each connecting the adjacent ends of two felly sections so as to not restrict their individual movement but at the same time prevent any section from flying radially outward should an accident occur. This individual movement of felly sections in a radial direction is very slight, so that comparatively small space between their adjacent ends and the ordinary looseness of fit of the pintles 18 in the felly sections and links will probably afford sufficient freedom. Obviously, however, if greater freedom is desired, the space between the ends of the sections may be made greater and the lost motion of their connections increased by enlarging or slotting the holes for the pintles.

In operation, the device having been filled with compressed air through the nipple 6, it will be understood that the felly sections 15, are all forced outward thereby and press against the tire 17. And as the wheel turns, each section in succession takes the strain or weight, and is forced slightly inward upon the spoke head 11, against the air pressure, whereby a resilient cushioning is effected.

Obviously, various detail modifications could be made by skilled mechanics without departing from the spirit and scope of my invention, and I therefore do not wish to be understood as limiting myself by the positive descriptive terms herein employed except as the state of the art may require.

Having thus described the invention, what I claim is;

1. In a wheel, the combination of a hub having a closed annular chamber, hollow spokes opening at their inner ends into said chamber, hollow felly sections independent of one another and each providing at its inner side a slideway adapted to receive the end of a spoke as a plunger, and a tire around said felly sections.

2. In a wheel, the combination of a hub providing an annular chamber and means for supplying compressed air thereto, hollow spokes each inserted at one end into the said hub in communication with the chamber thereof and being enlarged at its outer end, and hollow felly sections, one for each spoke and each provided with an arc-shaped chamber communicating with a tubular mouth having at its inner side a slideway for the enlarged end of its spoke.

3. In a wheel, the combination of a hub having an annular chamber, hollow spokes mounted in said hub in communication with said chamber and providing at their outer ends plungers, hollow felly sections independent of one another and each provided with an arc-shaped chamber communicating with a tubular mouth providing at its inner side a slideway for one of said plungers, and suitable packing means on said slideways.

4. In a wheel, the combination of a hub having a closed annular chamber, hollow spokes opening at their inner ends into said chamber, hollow felly sections independent of one another and each providing at its inner side a slideway adapted to receive the end of a spoke as a plunger and having longitudinal lateral flanges at its outer side, and a tire around the felly sections seated between said flanges.

5. In a wheel, the combination of a hub having a closed annular chamber, hollow spokes opening at their inner ends into said chamber, hollow felly sections independent of one another and each providing at its inner side a slideway adapted to receive the end of a spoke as a plunger, and links at the sides of said felly sections loosely connecting adjacent ends of the same.

GEORGE F. BRANDENBURGH.

In the presence of—
 RUSSELL M. EVERETT,
 ETHEL B. REED.